(12) United States Patent
Evans, V et al.

(10) Patent No.: US 10,198,611 B2
(45) Date of Patent: *Feb. 5, 2019

(54) FINGERPRINT SENSORS FOR MOBILE DEVICES

(71) Applicant: Essential Products, Inc., Palo Alto, CA (US)

(72) Inventors: David John Evans, V, Palo Alto, CA (US); Xinrui Jiang, San Jose, CA (US); Andrew E. Rubin, Los Altos, CA (US); Matthew Hershenson, Los Altos, CA (US); Xiaoyu Miao, Palo Alto, CA (US)

(73) Assignee: ESSENTIAL PRODUCTS, INC., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/616,761

(22) Filed: Jun. 7, 2017

(65) Prior Publication Data

US 2017/0270335 A1 Sep. 21, 2017

Related U.S. Application Data

(63) Continuation of application No. 15/336,355, filed on Oct. 27, 2016, now Pat. No. 9,710,689.
(Continued)

(51) Int. Cl.
*G06K 9/00* (2006.01)
*G02F 1/1333* (2006.01)
(Continued)

(52) U.S. Cl.
CPC ....... *G06K 9/0002* (2013.01); *G02F 1/13338* (2013.01); *G02F 1/133606* (2013.01);
(Continued)

(58) Field of Classification Search
CPC .............. G06K 9/0002; G02F 1/13338; G02F 1/133606; G02F 2001/133628; G02F 2201/50; G02F 2202/28; G06F 3/0412
See application file for complete search history.

(56) References Cited

U.S. PATENT DOCUMENTS 8,151,323 B2 4/2012 Harris et al.
9,710,689 B2 7/2017 Evans, V et al.
(Continued)

FOREIGN PATENT DOCUMENTS

JP 2005346238 A 12/2005
JP 2006330578 A 12/2006
(Continued)

OTHER PUBLICATIONS

U.S. Appl. No. 15/647,231 of Evans V et al. filed Jul. 11, 2017.
(Continued)

*Primary Examiner* — Gregory M Desire
(74) *Attorney, Agent, or Firm* — Perkins Coie LLP

(57) ABSTRACT

Various embodiments concern fingerprint sensors for mobile devices. By modifying one or more layers of a display assembly, a fingerprint sensor can be positioned directly beneath the display. For example, the air gap within the backlight structure could be replaced by an optically clear adhesive that allows waves emitted by a fingerprint sensor to properly propagate through the display assembly. In some embodiments, a fingerprint sensor is set within a recess in the display assembly. For example, a depression could be created in the protective substrate, and the fingerprint sensor could be set within the depression using an optically clear adhesive. The functionality of a fingerprint sensor could also be replicated by increasing the density of touch-sensing elements in certain areas of a display assembly that utilizes in-cell technology.

28 Claims, 11 Drawing Sheets

Related U.S. Application Data

(60) Provisional application No. 62/318,119, filed on Apr. 4, 2016, provisional application No. 62/249,130, filed on Oct. 30, 2015.

(51) Int. Cl.
  *G02F 1/1335* (2006.01)
  *G06F 3/041* (2006.01)
  *G06F 1/16* (2006.01)

(52) U.S. Cl.
  CPC .......... *G06F 1/1684* (2013.01); *G06F 3/0412* (2013.01); *G02F 2001/133628* (2013.01); *G02F 2201/50* (2013.01); *G02F 2202/28* (2013.01); *G06F 1/1643* (2013.01)

(56) References Cited

U.S. PATENT DOCUMENTS

| | | | |
|---|---|---|---|
| 9,955,325 B2 * | 4/2018 | Chrisikos | H04W 4/18 |
| 2003/0085649 A1 | 5/2003 | Wachi et al. | |
| 2008/0284925 A1 | 11/2008 | Han | |
| 2009/0256825 A1 | 10/2009 | Klinghult et al. | |
| 2011/0149205 A1 | 6/2011 | Lee et al. | |
| 2012/0105081 A1 | 5/2012 | Shaikh et al. | |
| 2012/0127084 A1 * | 5/2012 | Large | G06F 3/0416 345/173 |
| 2013/0113706 A1 * | 5/2013 | Park | H04M 1/23 345/168 |
| 2013/0160109 A1 | 6/2013 | Klinghult | |
| 2014/0133715 A1 | 5/2014 | Ballard et al. | |
| 2014/0333328 A1 | 11/2014 | Nelson et al. | |
| 2015/0036065 A1 | 2/2015 | Yousefpor et al. | |
| 2015/0123911 A1 | 5/2015 | Poliakov et al. | |
| 2015/0169136 A1 | 6/2015 | Ganti et al. | |
| 2015/0193129 A1 | 7/2015 | Cho et al. | |
| 2015/0364107 A1 | 12/2015 | Sakariya et al. | |
| 2017/0276994 A1 * | 9/2017 | Hsu | G02F 1/133308 |
| 2018/0151641 A1 * | 5/2018 | Choo | H04M 1/0266 |

FOREIGN PATENT DOCUMENTS

| | | |
|---|---|---|
| JP | 3196022 U | 1/2015 |
| KR | 20120116907 A | 10/2012 |
| KR | 20150068459 A | 6/2015 |
| TW | 201246087 A | 11/2012 |
| TW | 201501001 A | 1/2015 |
| TW | M497812 U | 3/2015 |
| TW | 201528120 A | 7/2015 |
| WO | 2008062544 A1 | 5/2008 |
| WO | 2015089453 A1 | 6/2015 |

OTHER PUBLICATIONS

Non-Final Office Action dated Jan. 27, 2017, for U.S. Appl. No. 15/336,355, of Evans et al. filed Oct. 27, 2016.
Notice of Allowance dated May 8, 2017, for U.S. Appl. No. 15/336,355, of Evans et al. filed Oct. 27, 2016.
Taiwanese Office Action with Search Report dated Jun. 6, 2017, for Taiwanese Patent Application No. 105135095 filed Oct. 28, 2016, 20 pages.
International Search Report and Written Opinion dated Feb. 2, 2017, for International Application No. PCT/US2016/0594959, pp. 1-11.
Examination Report No. 1 dated Sep. 22, 2017 for Australian Patent Application No. 2016343749, 3 pages.
Non-Final Office Action dated Nov. 17, 2017 for U.S. Appl. No. 15/647,231 of Evans V et al. filed Jul. 11, 2017.
Notice of Allowance dated Oct. 20, 2017, for Taiwanese Patent Application No. 105135095 filed Oct. 28, 2016, 4 pages.
Office Action dated Sep. 13, 2017 for Canadian Patent Application No. 2,976,829 filed Aug. 15, 2017, 3 pages.
Request for Supplementary Examination Report dated Sep. 28, 2017 for Singapore Patent Application No. 11201706644V filed Oct. 28, 2016, 7 pages.
Notice of Reason for Rejection dated Dec. 12, 2017 for Korean Patent Application No. 2017-7018361 filed Jul. 3, 2017, 59 pages.
Notification of Reasons for Refusal for Japanese Patent Application No. 2017-535693 dated Feb. 2, 2018, 8 pages.
Office Action and Search Report dated Jun. 27,2018 for Taiwan Patent Application No. 106140415 of Essential Products, Inc., 18 pages.
Notice of Allowance dated May 18, 2018 for Japanese Patent Application No. JP2017-535693 of Essential Products, Inc.
Notice of Reasons for Rejection dated Apr. 27, 2018 for Korean Patent Application No. KR2017-7018361 of Essential Products, Inc.

* cited by examiner

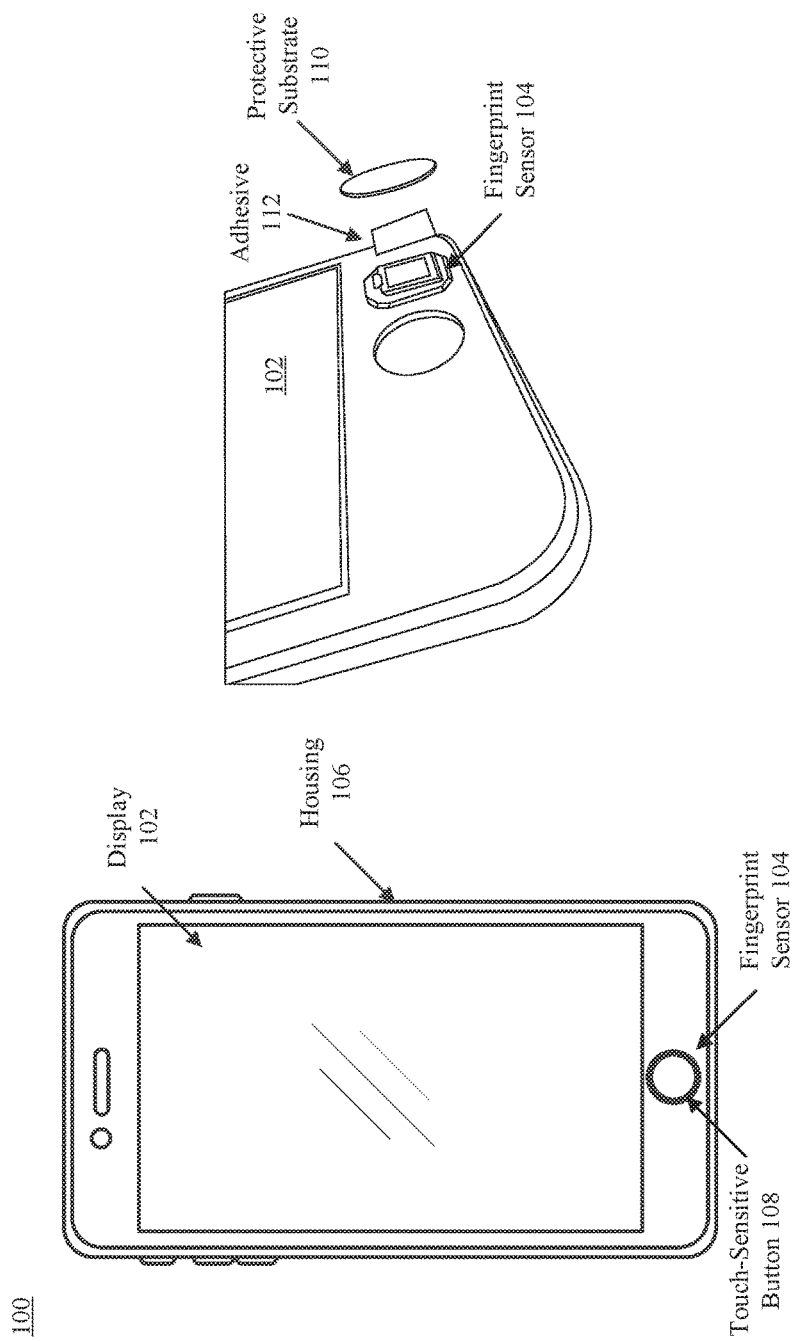

900

901
Acquire a user device that utilizes in-cell technology

902
Select a cell to be used as a fingerprint sensor

903
Locally increase the density of touch-sensing elements in the selected cell

904
Enabling the touch-sensing elements to generate signals responsive to a finger being placed on at least a portion of the cell

905
Processing the signals to determine whether the finger matches a stored fingerprint

FIG. 9

FINGERPRINT SENSORS FOR MOBILE DEVICES

CROSS-REFERENCE TO RELATED APPLICATIONS

This application is a continuation of U.S. patent application Ser. No. 15/336,355 titled "FINGERPRINT SENSORS FOR MOBILE DEVICES" and filed on Oct. 27, 2016, which claims priority to and the benefit of U.S. Provisional Application 62/249,130 titled "MOBILE DEVICES AND MOBILE DEVICE ACCESSORIES" and filed on Oct. 30, 2015, and U.S. Provisional Application 62/318,119 titled "FINGERPRINT SENSORS FOR MOBILE DEVICES" and filed on Apr. 4, 2016.

RELATED FIELD

Various embodiments relate generally to fingerprint sensors for user devices. More specifically, various embodiments relate to techniques for positioning a fingerprint sensor beneath the display of a user device.

BACKGROUND

Many types of electronic devices exist today that utilize a user interface that is viewed on a display, such as a liquid crystal display. A user typically interacts with the user interface using an input device that is mechanically actuated (e.g., by buttons or keys) or electronically activated (e.g., using a touch-sensitive screen). The user may view content, such as text and graphics, on the display, and interact with the content using the input device. For instance, a user could choose to issue a command, make a selection, or move a cursor within the bounds of the user interface. Touch-sensitive displays are becoming an increasingly popular option for many electronic devices due to the improved marketability and ease of use of such displays.

Oftentimes, electronic devices employ a series of privacy and security measures to protect information stored locally on, or accessible by, the electronic devices. For example, an electronic device (e.g., a mobile phone, tablet, or personal computer) may be configured to prompt the user to enter a password or have a fingerprint scanned before allowing the user to fully utilize the electronic device.

Fingerprint sensors, however, have traditionally been located in specific locations. For example, the fingerprint sensors on an iPhone® 6 and a Samsung Galaxy S6® are located below touch-sensitive buttons that are offset from the display. Fingerprint sensors are often located below a dedicated button due to design limitations of the display assembly as a whole and structural constraints of other internal components (e.g., the display panel and touch circuitry).

SUMMARY

Various techniques for positioning a fingerprint sensor beneath the display assembly of a user device are described herein. By placing the fingerprint sensor beneath the display assembly, a separate touch-sensitive button is no longer necessary and the total viewable area of the display assembly can be increased.

More specifically, the display assembly can include a protective substrate (e.g., glass, plastic, etc., or a composite thereof) with which a user interacts, touch circuitry that generates signals responsive to user interactions with the protective substrate, a display panel, and a backlight assembly that includes a diffuser and a backlight. The display panel could be, for example, a liquid crystal display (LCD) panel that is illuminated by light generated by the backlight. In some embodiments, an optically clear adhesive layer is disposed between the diffuser and the backlight that substantially or entirely eliminates the air gap that typically exists between these two components. Inclusion of the optically clear adhesive layer allows waves emitted by a fingerprint sensor located below the backlight assembly to properly propagate through the display assembly.

Additionally or alternatively, a depression could be created in the inward-facing side of the protective substrate (i.e., the side opposite the outward-facing side the user interacts with), and a fingerprint sensor could be set within the depression. The fingerprint sensor is preferably substantially or entirely transparent in such embodiments. Because the waves emitted by the fingerprint sensor only propagate through the protective substrate, the air gap between the diffuser and the backlight can be tolerated and need not be replaced by an optically clear adhesive layer.

Techniques are also described herein for increasing the density (or count) of touch-sensing elements in a display assembly that utilizes in-cell technology. Touch-sensing elements (e.g., capacitors) are normally disposed between display elements (e.g., liquid crystals) in an integrated display panel that supports touch functionality. Typically, the density of touch-sensing elements is only sufficient to recognize blunt user interactions (e.g., swipes and touches). However, by increasing the density of touch-sensing elements within a cell, that cell may be able to accurately replicate the functionality of a fingerprint sensor.

BRIEF DESCRIPTION OF THE DRAWINGS

One or more embodiments of the present invention are illustrated by way of example and not limitation in the figures of the accompanying drawings, in which like references indicate similar elements.

FIG. 1A depicts a user device that includes a display and a fingerprint sensor located beneath a touch-sensitive button offset from the display.

FIG. 1B depicts a conventional arrangement of a fingerprint sensor below the protective substrate of the touch-sensitive button.

FIG. 9 depicts a process for modifying the display assembly of a user device that utilizes in-cell technology to enable at least one cell to act as a fingerprint sensor.

DETAILED DESCRIPTION

Figure 2A:
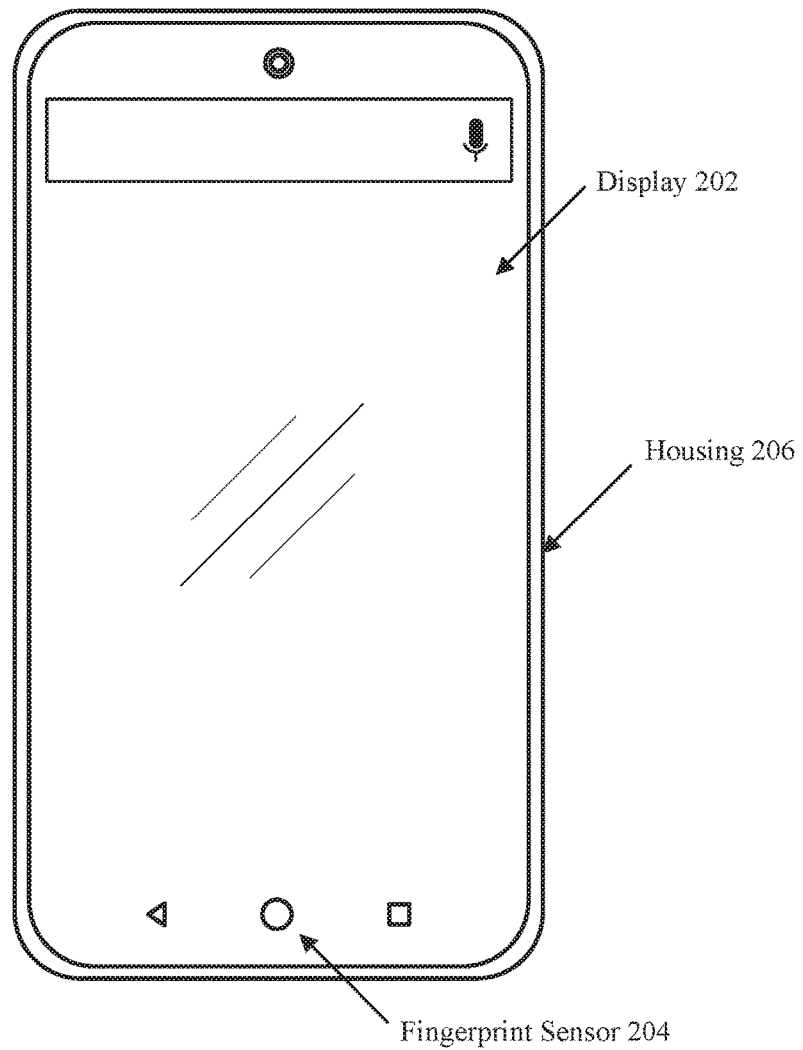
FIG. 2A depicts a user device that includes a fingerprint sensor located directly beneath the display.

Techniques for positioning a fingerprint sensor beneath the display assembly of a user device are described herein that enable the total viewable area of the display assembly to be increased. For example, distinct buttons offset from the display may no longer be necessary, and, as such, the total viewable area of the display assembly could extend to the edge of the user device housing. These techniques can be used with any electronic device having a user interface with which a user is able to interact, such as computers, tablets, personal digital assistants (PDAs), mobile phones, gaming devices, music players, wearable electronic devices (e.g., watches), and other portable electronic devices.

Terminology

Brief definitions of terms, abbreviations, and phrases used throughout this application are given below.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments necessarily mutually exclusive of other embodiments. Moreover, various features are described that may be exhibited by some embodiments and not by others. Similarly, various requirements are described that may be requirements for some embodiments and not for other embodiments.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of or connection between the elements can be physical, logical, or a combination thereof. For example, two components may be coupled directly to one another or via one or more intermediary channels or components. As another example, devices may be coupled in such a way that information can be passed there between, while not sharing any physical connection with one another. Additionally, the words "herein," "above," "below," and words of similar import, when used in this application, shall refer to this application as a whole and not to any particular portions of this application. Where the context permits, words in the Detailed Description using the singular or plural number may also include the plural or singular number respectively. The word "or," in reference to a list of two or more items, covers all of the following interpretations of the word: any of the items in the list, all of the items in the list, and any combination of the items in the list.

If the specification states a component or feature "may," "can," "could," or "might" be included or have a characteristic, that particular component or feature is not required to be included or have the characteristic.

The term "module" refers broadly to software, hardware, or firmware components. Modules are typically functional components that can generate useful data or other output using specified input(s). A module may or may not be self-contained. An application program (also called an "application") may include one or more modules, or a module can include one or more application programs.

The terminology used in the Detailed Description is intended to be interpreted in its broadest reasonable manner, even though it is being used in conjunction with certain examples. The terms used in this specification generally have their ordinary meanings in the art, within the context of the disclosure, and in the specific context where each term is used. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that an element or feature can be described in more than one way.

Consequently, alternative language and synonyms may be used for any one or more of the terms discussed herein, and special significance is not to be placed on whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to the various embodiments given in this specification.

System Overview

FIGS. 1A-B depict a user device 100 that includes a display 102 and a fingerprint sensor 104. As noted above, the fingerprint sensor 104 is traditionally located below a touch-sensitive button 108 that is offset from the display 102. Fingerprint sensors could also (or instead) be integrated within the housing 106 of the user device 100. For example, fingerprint sensors may located along one of the lateral sides of the user device 100.

The touch-sensitive button 108 is typically designed such that the fingerprint sensor 104 is positioned below a protective substrate 110. An adhesive layer 112 may be disposed between the fingerprint sensor 104 and the protective substrate 110. Here, for example, the fingerprint sensor 104 is located beneath the protective substrate 110 of a touch-sensitive button that comes into direct contact with the user's finger. Because only the protective substrate 110 (and possibly an adhesive layer 112) separates the fingerprint sensor 104 from the user's finger, the fingerprint sensor 104 remains very accurate. But this type of arrangement also prevents the fingerprint sensor 104 from being located in certain desirable locations (e.g., under the display 102 itself).

Figure 2B:
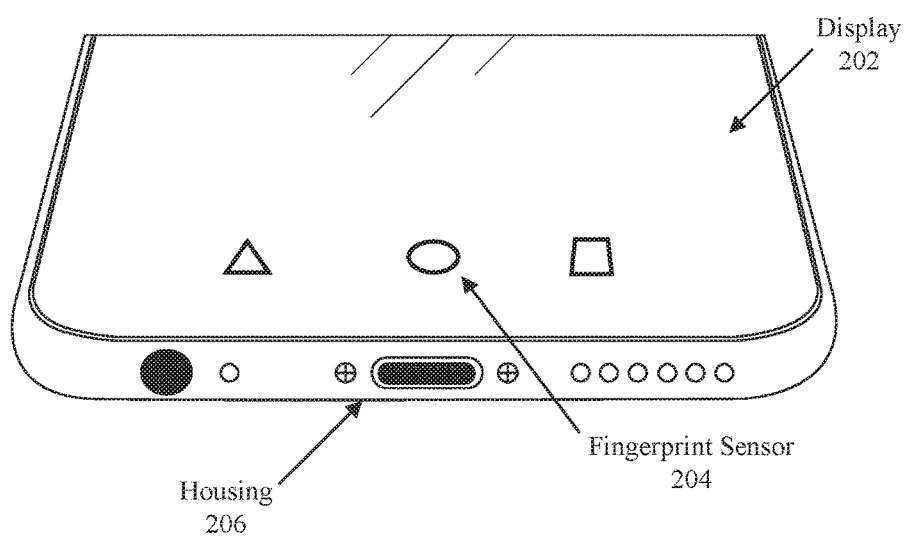
FIG. 2B is a perspective view of the user device that illustrates how such a configuration enables the display to extend to the housing of the user device.

FIG. 2A depicts a user device 200 that includes a fingerprint sensor 204 located directly beneath the display 202 in accordance with various embodiments. FIG. 2B, meanwhile, is a perspective view of the user device 200 that illustrates how such a configuration enables the display 202 to extend to the housing 206 of the user device 200. Positioning the fingerprint sensor 204 beneath the display 202 allows the total viewable area of the display 202 to be increased because space does not need to be allocated to a distinct button (as shown in FIGS. 1A-B).

In such embodiments, the location of the fingerprint sensor 204 could be identified by an icon, such as the circular icon of FIGS. 2A-B, or a feature in the protective outer substrate, such as an indentation or dimple. The display 202 may depict where the user is to place a finger when the user attempts to log into the user device 200 by highlighting the proper location (e.g., by illuminating a portion of the display 202, or by presenting a digital image in the shape of a target or fingerprint).

Figure 3:
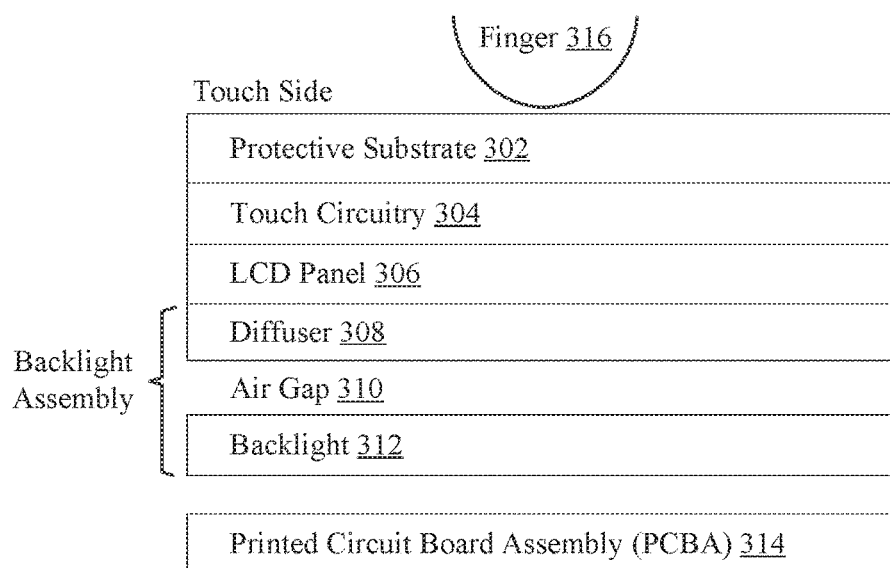
FIG. 3 is a side view of a conventional display assembly for a user device.

FIG. 3 is a side view of a conventional display assembly 300 for a user device. The display assembly 300 typically includes a protective substrate 302 that the user interacts with (e.g., by making contact with an outer surface using a finger 316). The protective substrate is preferably substantially or entirely transparent and can be composed of glass, plastic, or any other suitable material (e.g., crystallized aluminum oxide). Touch circuitry 304, which generates signals responsive to a user interaction with the protective substrate 302, is located below the protective substrate 302. The touch circuitry 304 can include, for example, a layer of driving lines that provide current and a layer of sensing lines that determine the location of a touch by detecting changes in the current caused by the user's finger 316. Each of the driving lines and sensing lines can include multiple electrodes ("nodes") that together create a coordinate grid for the display assembly 300. The coordinate grid may be used by a processor on a printed circuit board assembly (PCBA) 314 to determine the intent of a user interaction. Oftentimes, the touch circuitry 304 is mounted to (or embedded within) a transparent substrate, such as glass.

A liquid crystal display (LCD) panel 306 (also referred to as a "liquid crystal layer") is located below the touch circuitry 304. Although the term "LCD panel" is used throughout the Detailed Description for purposes of illustration, other display technologies could also be used, such as light emitting diodes (LEDs), organic light emitting diodes (OLED), electrophoretic/electronic ink ("e-ink"), etc. Because the LCD panel 306 does not naturally generate light, it is placed above a backlight assembly configured to illuminate the LCD panel 306. The backlight assembly includes a backlight 312 and, in some embodiments, a diffuser 308 that is able to distribute a substantially even amount of light generated by the backlight 312 to the liquid crystals of the LCD panel 306. The diffuser 308 may be necessary when the backlight 312 is made of one or more point light sources that do not naturally project light in a substantially even manner. One skilled in the art will recognize that some or all of the components of the backlight assembly may not be necessary when non-LCD display technologies are used.

An air gap 310 often exists between the backlight 312 and the diffuser 308. Although maintaining the air gap 310 helps cool the backlight assembly, it also causes additional reflection and refraction of waves that propagate through the display assembly 300. The additional reflection and refraction prevents a fingerprint sensor from being placed behind the backlight 312 and being made part of a conventional display assembly 300.

One or more components of the display assembly 300 may be coupled to a printed circuit board assembly (PCBA) 314. For example, processor(s) on the PCBA 314 may be configured to control the backlight 312, LCD panel 306, and touch circuitry 304. The PCBA 314 can also include one or more processors configured to execute touch controller software, system software, etc.

Figure 4:
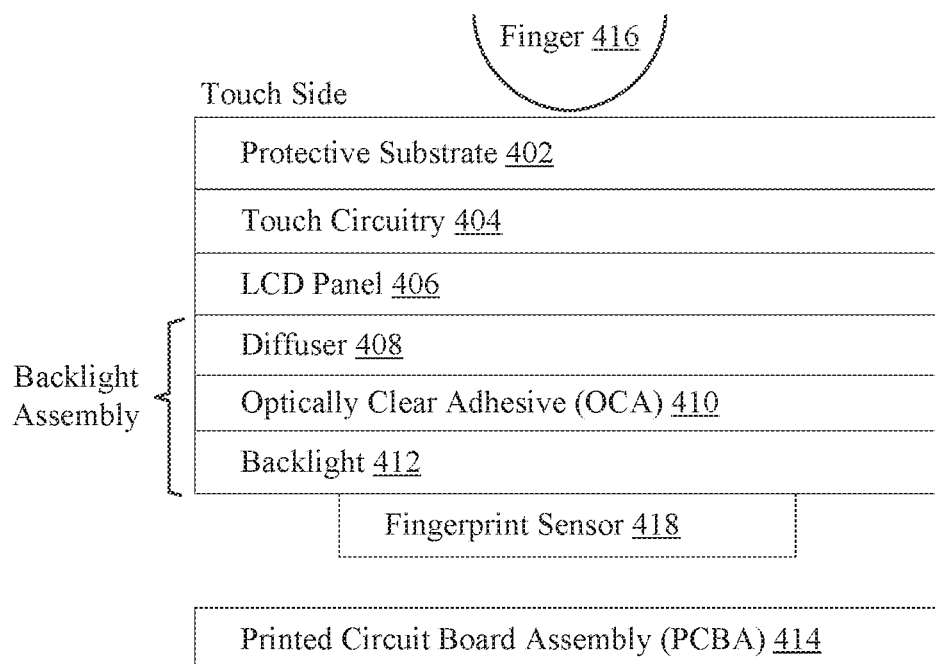
FIG. 4 is a side view of a display assembly in which the air gap between the diffuser and the backlight has been replaced by an optically clear adhesive layer.

FIG. 4 is a side view of a display assembly 400 in which the air gap between the diffuser 408 and the backlight 412 has been replaced by an optically clear adhesive (OCA) layer 410 as may occur in some embodiments. The OCA layer 410 (or some other laminate) solidifies the entire display assembly 400, which allows waves (e.g., sound waves, light waves) emitted by a fingerprint sensor 418 to properly propagate through the display assembly 400 toward the user's finger 416, and then return to the fingerprint sensor 418 for processing.

More specifically, the OCA layer 410 bonds the diffuser 408 to the backlight 412 and substantially or entirely eliminates the air gap between these components. The OCA layer 410 can include an acrylic-based or silicon-based adhesive, as well as one or more layers of indium-tin-oxide (ITO). The OCA layer 410 is preferably substantially or entirely transparent (e.g., greater than 99% light transmission) and may display good adhesion to a variety of substrates, including glass, polyethylene (PET), polycarbonate (PC), polymethyl methacrylate (PMMA), etc.

Different types of fingerprint sensors 418 could be used based on the desired accuracy, composition of other components in the display assembly 400, etc. For example, the fingerprint sensor 418 could be a capacitive sensor that includes an array of capacitor plates ("capacitors") used to image the fingerprint, an optical sensor that includes an array of photodiodes or phototransistor detectors that convert light incident on the detection into an electrical charge, a thermal sensor that utilizes a pyro-electric material that measures contact temperature of the fingerprint ridges and valleys, a radio frequency ("RF") sensor that includes a detector array that reads RF signals, an ultrasonic sensor that includes an array of nodes that generate sound waves that propagate through the display assembly 400, etc.

Figure 5:
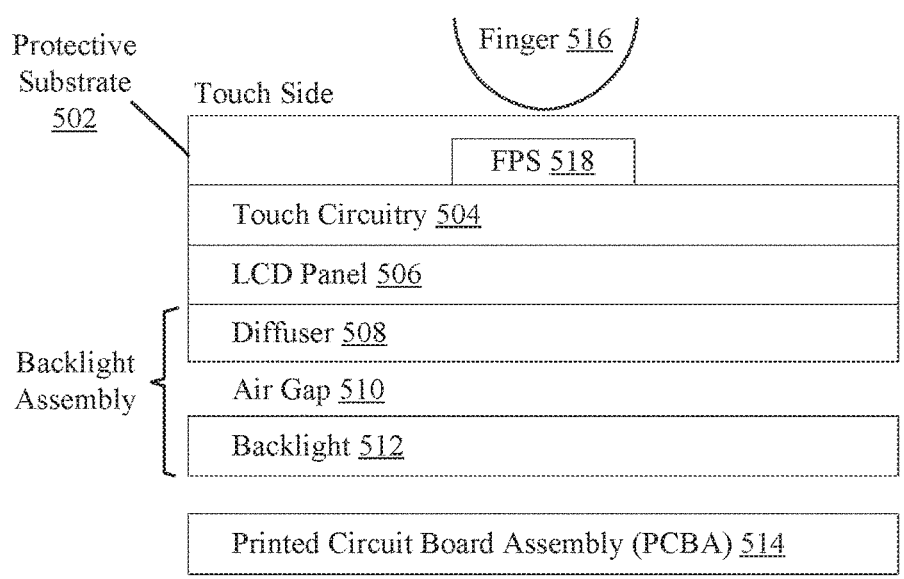
FIG. 5 is a side view of a display assembly that includes a fingerprint sensor set within a depression created in the inward-facing surface of a protective substrate.

FIG. 5 is a side view of a display assembly 500 that includes a fingerprint sensor ("FPS") 518 set within a depression in the protective substrate 502. Such an arrangement allows the fingerprint sensor 518 to be placed within the display assembly 500, but eliminates the issues typically caused by the air gap 510 because waves generated by the fingerprint sensor 518 need only propagate through the protective substrate 502.

The depression could be formed in the protective substrate 502 during the manufacturing process, and the fingerprint sensor 518 can then be set within the newly-formed depression. In such embodiments, the fingerprint sensor 518 may be affixed within the depression using an optically clear adhesive. Alternatively, the fingerprint sensor 518 could be embedded within the protective substrate 502. The fingerprint sensor 518 is preferably substantially or entirely transparent so that the user in unaware of the presence of the fingerprint sensor 518 in the protective substrate 502. Because transparent fingerprint sensors do not disturb digital content displayed by the display assembly 500, multiple fingerprint sensors could be located underneath the protective substrate 502 (e.g., along the bottom edge of the display, or in each of the four corners of the display).

An air gap 510 may be allowed to remain between the diffuser 508 and the backlight 512 since waves from the fingerprint sensor 518 need only propagate through the protective substrate 502. That is, the presence of the air gap 510 does not affect the accuracy of the fingerprint sensor 518 in such an arrangement. Therefore, the air gap 510 exists in some embodiments, while in other embodiments the air gap 510 is replaced by an OCA layer (or some other laminate). Whether the air gap 510 is replaced could depend on, for example, manufacturing cost, desired display quality, etc.

Figure 6:
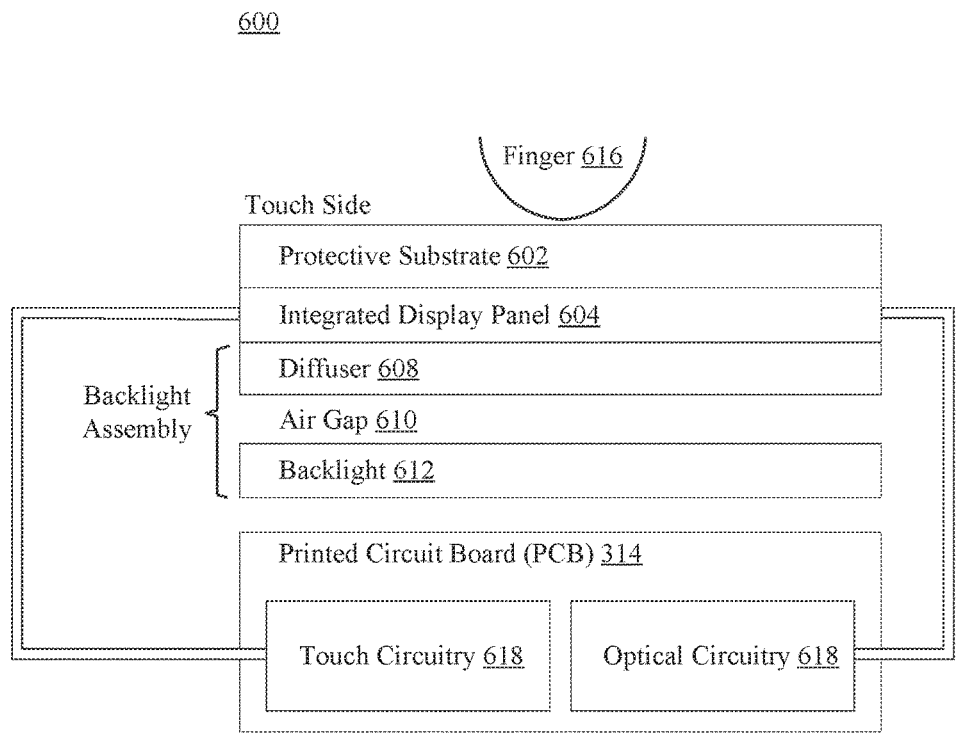
FIG. 6 is a side view of a display assembly that utilizes in-cell technology to decrease the total width of the display assembly.

FIG. 6 is a side view of a display assembly 600 that utilizes in-cell technology to decrease the total width of the display assembly 600. By combining the separate layers for touch and display into a single display panel with touch functionality 604, the total height of the display assembly 600 is decreased. This reduces the amount of reflection and refraction experienced by waves emitted by a fingerprint sensor located beneath the backlight 612 as the waves propagate through the display assembly 600. The accuracy of the fingerprint sensor could be further improved by replacing the air gap 610 with an OCA layer (as described above with respect to FIG. 4).

Embodiments utilizing in-cell technology include an integrated display panel 604 that includes display elements (e.g., liquid crystals) and touch-sensing elements (e.g., capacitors) that enable touch functionality. The touch-sensing elements are normally disposed between display elements. For example, a capacitor could be disposed between each pixel (i.e., between each liquid crystal corresponding to red, green, or blue) of an integrated LCD panel. The touch-sensing elements are configured to generate a signal responsive to determining the user's finger 616 has contacted the protective substrate 602. However, the density of capacitors in such an arrangement is typically only sufficient to recognize blunt user interactions, such as swipes and touches.

Figure 7:
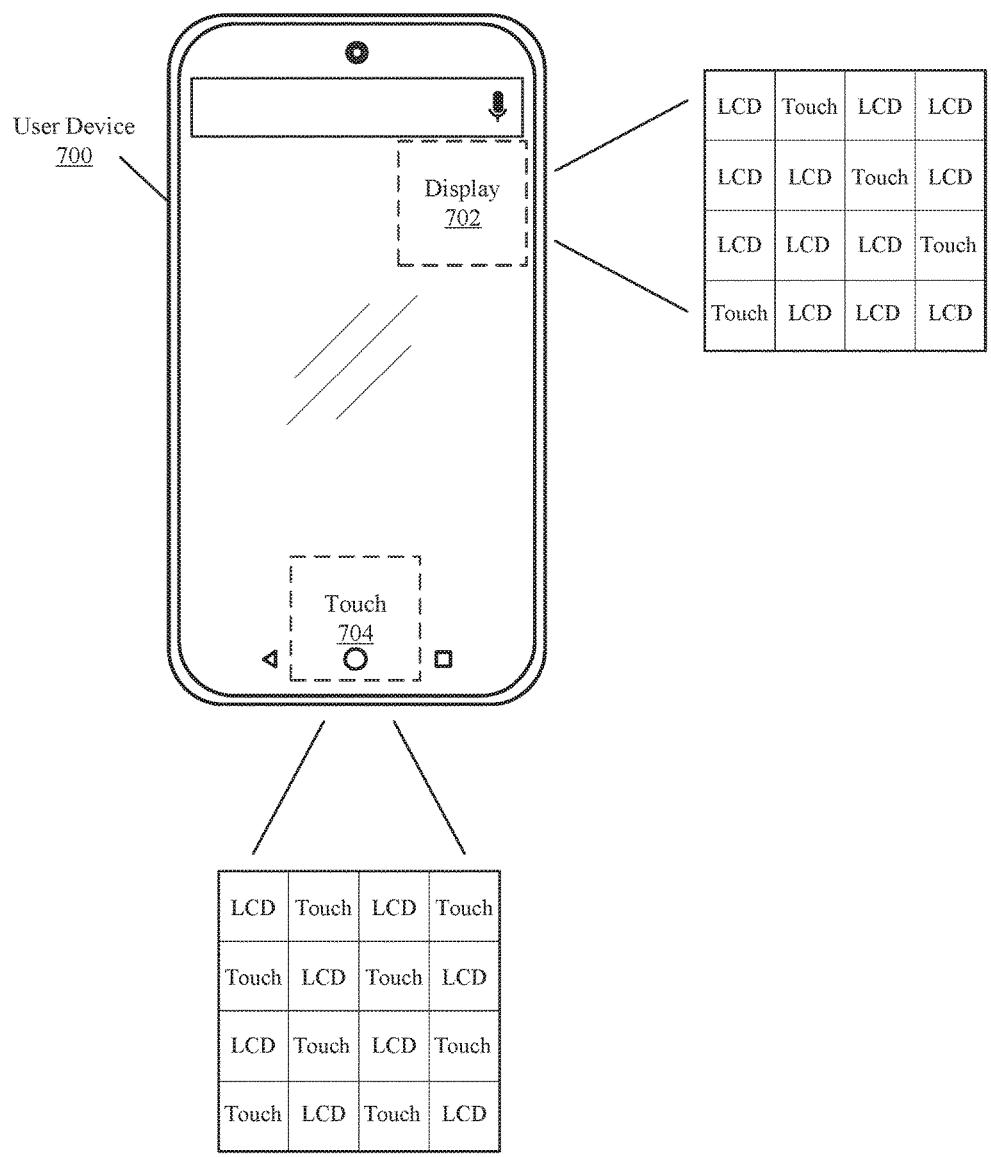
FIG. 7 depicts how the display assembly can be broken up into cells that can accurately replicate the functionality of a fingerprint sensor.

As shown in FIG. 7, the display of the user device 700 can be broken up into segments referred to as "cells." In some embodiments, the density of the touch-sensing elements (e.g., capacitors) is increased in certain cells that could serve as a fingerprint sensor. Capacitive fingerprint technology can then be utilized to image a user's finger by locally increasing the density of touch-sensing elements in certain cells.

For example, FIG. 7 depicts sample compositions of a display cell 702 and a touch cell 704, which includes a higher density of touch-sensing elements. The density (or total number) of touch-sensing elements can be increased by increasing the total number of pixels within a particular cell or by replacing display elements (e.g., liquid crystals) with touch-sensing elements (e.g., capacitors). In some embodiments the touch-sensing elements are arranged in particular patterns (e.g., every other pixel or clustering in certain areas), while in other embodiments the touch-sensing elements are arranged randomly amongst the display elements.

However, an increase in the touch-sensitivity of a cell is typically accompanied by a loss in display performance (e.g., color saturation, maximum resolution). Consequently, it may be desirable to allocate certain locally-sensitive areas of the display for sensing fingerprints. For example, the user device of FIG. 2A can include a dimpled button that has a decreased resolution. Area(s) allocated to fingerprint sensing could be chosen because high display performance is not necessary (e.g., around the outer edge of the display), because the user is unlikely to notice the decrease in display performance (e.g., around or within a structural feature of the protective substrate, such as a dimpled button), etc.

Figure 8:
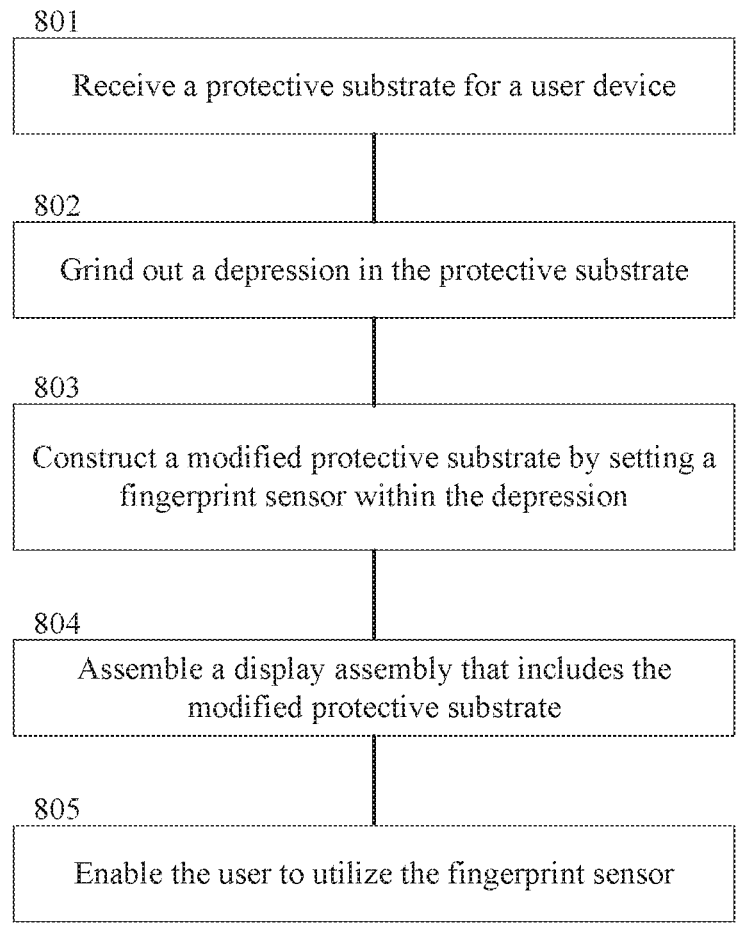
FIG. 8 depicts a process for manufacturing a display assembly that includes a fingerprint sensor.

FIG. 8 depicts a process 800 for manufacturing a display assembly that includes a fingerprint sensor. A protective substrate for a user device is initially received by a manufacturer (step 801). The protective substrate could be glass, plastic, or some other suitable material (e.g., crystallized aluminum oxide). The protective substrate includes two sides: an outward-facing side with which a user is able to make contact, and an inward-facing side that is directly adjacent to another layer of the display assembly (e.g., touch circuitry).

The manufacturer can then create a depression in the inward-facing side of the protective substrate (step 802), and construct a modified protective substrate by setting a fingerprint sensor within the depression (step 803). The fingerprint sensor may be affixed within the depression using an optically clear adhesive.

A device assembly can then be assembled (e.g., by the manufacturer or another entity/individual) that includes the modified protective substrate (step 804). The device assembly could include some or all of the components of device assembly 500 of FIG. 5. After assembly has been completed, the user device (and, more specifically, the device assembly) enables a user to utilize the fingerprint sensor when logging into the user device or interacting with digital content presented by the user device (step 805).

FIG. 9 depicts a process 900 for modifying the display assembly of a user device that utilizes in-cell technology to enable at least a portion of the display assembly to act as a fingerprint sensor. A display assembly that utilizes in-cell technology is initially acquired by a manufacturer (step 901). As described above, in-cell technology eliminates at least one layer within the display assembly. For example, an integrated display layer with touch functionality may be able to replicate the functionality of both an LCD panel and touch circuitry.

The display assembly is divided into a plurality of cells that include display elements (e.g., liquid crystals), touch-sensing elements (e.g., capacitors), or a combination of both. Each cell typically includes at least some touch-sensing elements that allow blunt user interactions (e.g., swipes, touches) to be recognized.

At least one of the cells is selected to be used as a fingerprint sensor (step 902), and then the density of touch-sensing elements is increased in the selected cell (step 903). Increasing the density of touch-sensing elements improves the touch sensitivity of the cell, but also decreases the display performance of the cell. Therefore, cells corresponding to particular portions of the display may be identified as candidates for fingerprint sensing.

The display assembly is able to generate signals responsive to a finger being placed on at least a portion of the selected cell due to the increased touch sensitivity (step 904). The signals generated by touch-sensing elements can be transmitted to touch circuitry that analyzes the signals and determines whether the signals associated with the imaged finger are indicative of a match with a fingerprint stored in a memory accessible to the user device (step 905). The fingerprint could be stored within a local memory (i.e., a memory within the user device) or a remote memory accessible over a network.

Unless contrary to physical possibility, it is envisioned that the steps described above may be performed in various sequences and combinations. For instance, a user device could include both a fingerprint sensor set within a depression in the protective substrate and a fingerprint sensor created by locally increasing the density of touch-sensing elements in a particular cell of the display assembly.

Processing System

Figure 10:
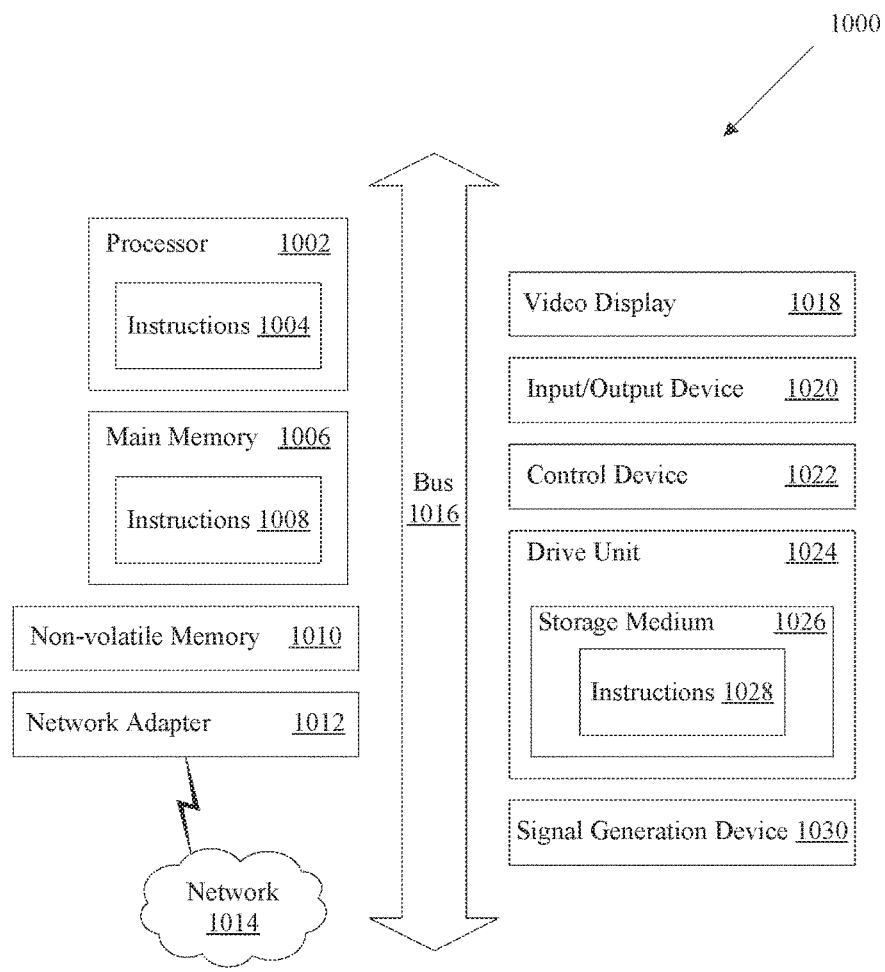
FIG. 10 is a block diagram illustrating an example of a processing system in which at least some operations described herein can be implemented.

FIG. 10 is a block diagram illustrating an example of a processing system 1000 in which at least some operations described herein can be implemented. The computing system may include one or more central processing units ("processors") 1002, main memory 1006, non-volatile memory 1010, network adapter 1012 (e.g., network interfaces), video display 1018, input/output devices 1020, control device 1022 (e.g., keyboard and pointing devices), drive unit 1024 including a storage medium 1026, and signal generation device 1030 that are communicatively connected to a bus 1016. The bus 1016 is illustrated as an abstraction that represents any one or more separate physical buses, point to point connections, or both connected by appropriate bridges, adapters, or controllers. The bus 1016, therefore, can include, for example, a system bus, a Peripheral Component Interconnect (PCI) bus or PCI-Express bus, a Hyper-Transport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire."

In various embodiments, the processing system 1000 operates as part of a user device (e.g., user device 200 of FIGS. 2A-B), although the processing system 1000 may be connected (e.g., wired or wirelessly) to the user device. In a networked deployment, the processing system 1000 may operate in the capacity of a server or a client machine in a client-server network environment, or as a peer machine in a peer-to-peer (or distributed) network environment.

The processing system 1000 may be a server computer, a client computer, a personal computer (PC), a tablet PC, a laptop computer, a personal digital assistant (PDA), a cellular telephone, an iPhone®, an iPad®, a Blackberry®, a processor, a telephone, a web appliance, a network router, switch or bridge, a console, a hand-held console, a gaming device, a music player, or any portable, device or any machine capable of executing a set of instructions (sequential or otherwise) that specify actions to be taken by the processing system.

While the main memory 1006, non-volatile memory 1010, and storage medium 1026 (also called a "machine-readable medium) are shown to be a single medium, the term "machine-readable medium" and "storage medium" should be taken to include a single medium or multiple media (e.g., a centralized or distributed database, and/or associated caches and servers) that store one or more sets of instructions 1028. The term "machine-readable medium" and "storage medium" shall also be taken to include any medium that is capable of storing, encoding, or carrying a set of instructions for execution by the computing system and that cause the computing system to perform any one or more of the methodologies of the presently disclosed embodiments.

In general, the routines executed to implement the embodiments of the disclosure, may be implemented as part of an operating system or a specific application, component, program, object, module or sequence of instructions referred to as "computer programs." The computer programs typically comprise one or more instructions (e.g., instructions 1004, 1008, 1028) set at various times in various memory and storage devices in a computer, and that, when read and executed by one or more processing units or processors 1002, cause the processing system 1000 to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices 1010, floppy and other removable disks, hard disk drives, optical disks (e.g., Compact Disk Read-Only Memory (CD ROMS), Digital Versatile Disks (DVDs)), and transmission type media, such as digital and analog communication links.

The network adapter 1012 enables the processing system 1000 to mediate data in a network 1014 with an entity that is external to the processing system 1000 through any known and/or convenient communications protocol supported by the processing system 1000 and the external entity. The network adapter 1012 can include one or more of a network adaptor card, a wireless network interface card, a router, an access point, a wireless router, a switch, a multi-layer switch, a protocol converter, a gateway, a bridge, bridge router, a hub, a digital media receiver, and/or a repeater.

The network adapter 1012 can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

As indicated above, the techniques introduced here implemented by, for example, programmable circuitry (e.g., one or more microprocessors), programmed with software and/or firmware, entirely in special-purpose hardwired (i.e., non-programmable) circuitry, or in a combination or such forms. Special-purpose circuitry can be in the form of, for example, one or more application-specific integrated circuits (ASICs), programmable logic devices (PLDs), field-programmable gate arrays (FPGAs), etc.

Remarks

The foregoing description of various embodiments has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling others skilled in the relevant art to understand the claimed subject matter, the various embodiments, and the various modifications that are suited to the particular uses contemplated.

Although the above Detailed Description describes certain embodiments and the best mode contemplated, no matter how detailed the above appears in text, the embodiments can be practiced in many ways. Details of the systems and methods may vary considerably in their implementation details, while still being encompassed by the specification. As noted above, particular terminology used when describing certain features or aspects of various embodiments should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless those terms are explicitly defined herein. Accordingly, the actual scope of the invention encompasses not only the disclosed embodiments, but also all equivalent ways of practicing or implementing the embodiments under the claims.

The language used in the specification has been principally selected for readability and instructional purposes, and it may not have been selected to delineate or circumscribe the inventive subject matter. It is therefore intended that the scope of the invention be limited not by this Detailed Description, but rather by any claims that issue on an application based hereon. Accordingly, the disclosure of various embodiments is intended to be illustrative, but not limiting, of the scope of the embodiments, which is set forth in the following claims.

The invention claimed is:

1. A display assembly comprising:
    a display panel;
    a backlight assembly located below the display panel that includes
        a backlight configured to generate light that illuminates the display panel,
        an optically clear adhesive layer disposed between the backlight and a diffuser,
            wherein the optically clear adhesive layer substantially eliminates an air gap between the backlight and the diffuser, and
        the diffuser configured to diffuse the light emitted toward the display panel by the backlight; and
    a fingerprint sensor located below the backlight assembly.

2. The display assembly of claim 1, wherein the display panel is a liquid crystal display (LCD) panel.

3. The display assembly of claim 1, further comprising:
    a protective substrate located above the display panel.

4. The display assembly of claim 3, wherein the protective substrate is comprised of glass.

5. The display assembly of claim 1, further comprising:
    touch circuitry that generates a signal responsive to a user interaction with the display assembly.

6. The display assembly of claim 5, wherein the touch circuitry is located above the display panel.

7. The display assembly of claim 5, wherein the touch circuitry is affixed to a mounting substrate that is directly adjacent to the display panel.

8. The display assembly of claim 1, wherein elimination of the air gap reduces reflection and refraction of waves emitted by the fingerprint sensor as the waves propagate through the display assembly.

9. The display assembly of claim 1, wherein the fingerprint sensor is an ultrasonic fingerprint sensor.

10. The display assembly of claim 1, wherein the optically clear adhesive layer comprises an acrylic-based adhesive or a silicone-based adhesive.

11. A display assembly comprising:
    a protective substrate having
        an outward-facing side with which a user makes contact during an interaction with the display assembly, and
        an inward-facing side having a depression formed therein; and
    a substantially transparent fingerprint sensor that is set within the depression.

12. The display assembly of claim 11, further comprising:
    touch circuitry located below the protective substrate, the touch circuitry being configured to generate a signal responsive to a user interaction with the outward-facing side of the protective substrate.

13. The display assembly of claim 11, wherein the substantially transparent fingerprint sensor is an ultrasonic sensor, an optical sensor, a radio frequency (RF) sensor, a thermal sensor, a capacitive sensor, or a combination thereof.

14. The display assembly of claim 11, wherein the substantially transparent fingerprint sensor is affixed within the depression using an optically clear adhesive.

15. The display assembly of claim 14, wherein the optically clear adhesive comprises an acrylic-based adhesive or a silicone-based adhesive.

16. A method comprising:
    acquiring a protective substrate to be used in a display assembly,
        wherein the protective substrate includes
            an outward-facing side with which a user makes contact during an interaction with the display assembly, and
            an inward-facing side;
    forming a depression on the inward-facing side of the protective substrate;
    setting a substantially transparent fingerprint sensor within the depression; and
    affixing the substantially transparent fingerprint sensor within the depression using an optically clear adhesive.

17. The method of claim 16, wherein the optically clear adhesive is indium-tin-oxide (ITO).

18. The method of claim 16, wherein the protective substrate is comprised of glass, plastic, or crystallized aluminum oxide.

19. The method of claim 16, wherein the protective substrate includes multiple substrate layers having an adhesive layer interposed between each pair of substrate layers.

20. A display assembly comprising:
    a protective substrate; and
    an integrated display panel located below the protective substrate,
        wherein the integrated display panel is divided into a plurality of cells that include display elements, touch-sensing elements, or a combination thereof,
        wherein the plurality of cells includes
            a first cell having a first count of touch-sensing elements, and
            a second cell having a second count of touch-sensing elements sufficient to simulate the functionality of a fingerprint scanner, and
        wherein the first count and the second count are different values.

21. The display assembly of claim 20, wherein the display elements are liquid crystals.

22. The display assembly of claim 20, wherein the touch-sensing elements are capacitors.

23. The display assembly of claim 22, wherein each capacitor is configured to generate a signal responsive to determining a user has made contact with the protective substrate directly above the corresponding capacitor.

24. The display assembly of claim 20, further comprising:
    touch circuitry for analyzing signals generated by the touch-sensing elements responsive to a user interaction with the protective substrate; and
    display circuitry for generating signals to control the display elements,
        wherein the touch circuitry and the display circuitry are included on a printed circuit board assembly.

25. The display assembly of claim 20, wherein cells expected to be the subject of frequent user interactions include a higher density of touch-sensing elements compared to other cells.

26. The display assembly of claim 20, further comprising:
    a processor configured to
        monitor whether a user has placed a finger on the second cell;

responsive to determining that the user placed the finger on at least a portion of the second cell, generate, by each touch-sensing element located within the at least a portion of the second cell, a signal based on which part of the finger is directly above the corresponding touch-sensing element; and processing the signals to determine whether the finger matches a fingerprint stored in a memory accessible to a user device of which the display assembly is a part.

27. The display assembly of claim 26, wherein the memory is housed within the user device.

28. The display assembly of claim 26, wherein the memory is accessible to the user device via a connection across a network.

* * * * *